T. L. BRIGGS & H. F. MERRIAM.
PROCESS OF MAKING OLEUM.
APPLICATION FILED AUG. 11, 1910.
1,013,638.
Patented Jan. 2, 1912.
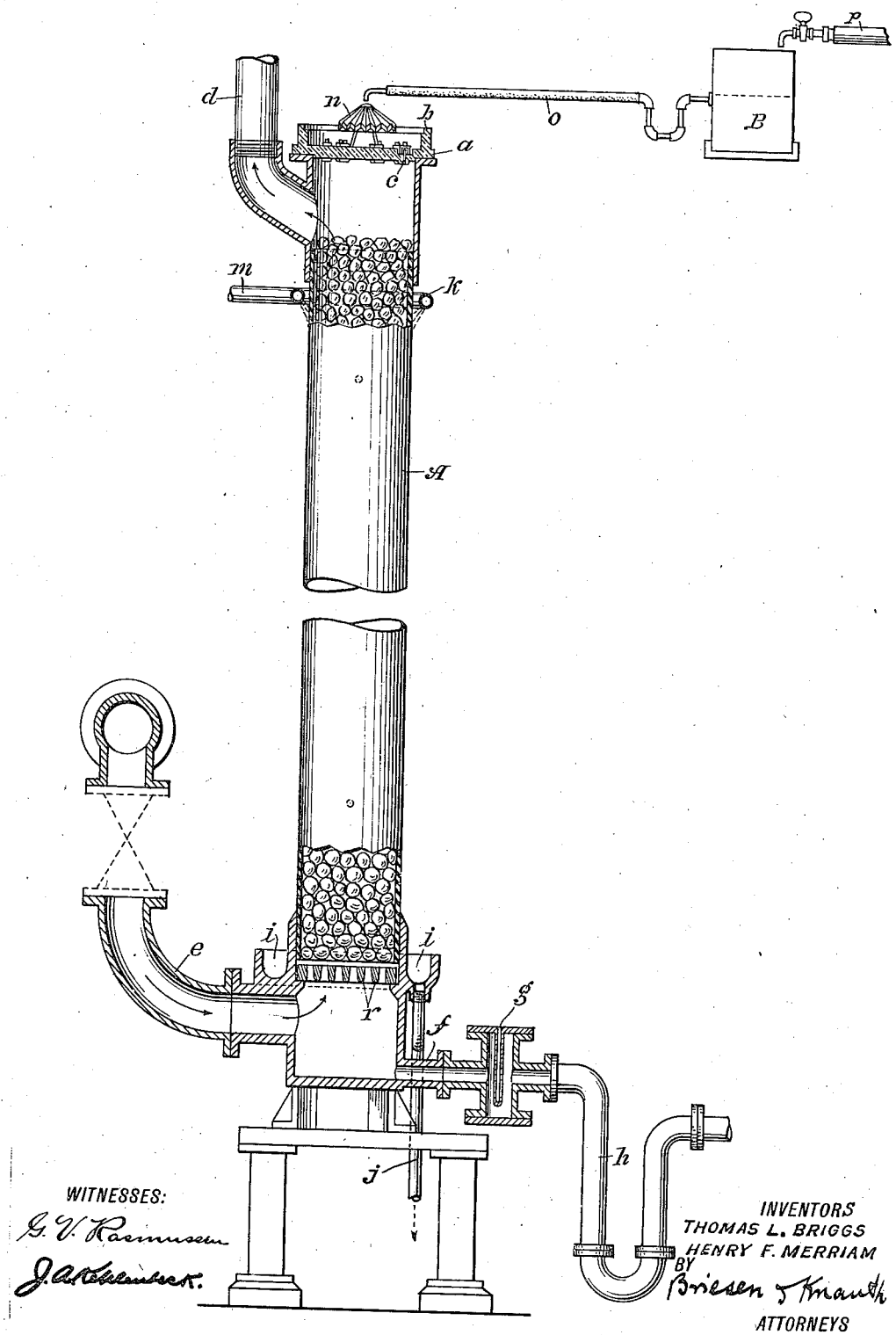
WITNESSES:
INVENTORS
THOMAS L. BRIGGS
HENRY F. MERRIAM
BY
ATTORNEYS

UNITED STATES PATENT OFFICE.

THOMAS LYNTON BRIGGS, OF FLUSHING, NEW YORK, AND HENRY F. MERRIAM, OF SUMMIT, NEW JERSEY, ASSIGNORS TO GENERAL CHEMICAL COMPANY, OF NEW YORK, N. Y., A CORPORATION OF NEW YORK.

PROCESS OF MAKING OLEUM.

1,013,638.  Specification of Letters Patent.  Patented Jan. 2, 1912.

Application filed August 11, 1910. Serial No. 576,714.

*To all whom it may concern:*

Be it known that we, THOMAS LYNTON BRIGGS, a subject of the King of Great Britain, and resident of Flushing, county of Queens, State of New York, and HENRY F. MERRIAM, a citizen of the United States, and resident of Summit, county of Union, State of New Jersey, have jointly invented certain new and useful Improvements in Processes for the Manufacture of Fuming Sulfuric Acid or Oleum, of which the following is a specification.

Our invention relates to an improved process for the manufacture of fuming sulfuric acid, or oleum, as it is sometimes called.

More particularly our improved process relates to certain methods of procedure and to the regulation and control of the temperature at which the involved reactions are carried on.

The object of our invention it to provide a process for the production of oleum which is definite and certain, which can be applied and carried out economically, and which may be depended upon to give uniform and unvarying results.

A further object of our invention is to provide a process by means of which the absorption of $SO_3$ by sulfuric acid of a strength between 97 and 99.5% (absolute $H_2SO_4$) shall be complete so that there is no excess of $SO_3$ to escape into the atmosphere and thereby damage surrounding property and the health and comfort of the vicinage.

In carrying out our process we prefer to use an apparatus of the kind illustrated in the drawings which represents an elevation, partly in section, of the said apparatus.

In the drawings A is a tower or upright tube having at the top thereof a head *a* provided with a peripheral upstanding flange *b* and having its bottom pierced with holes *c*. At one side of tower near its top is an opening from which leads an outlet pipe *d*. The tower near its bottom has an inlet pipe *e* and, still nearer the bottom, a smaller outlet pipe *f* leading therefrom through a thermometer pocket *g* and thence to a siphon trap *h*. Above the inlet pipe *e* the tower has a circumferential channel or trough *i*, having a discharge pipe *j*. The upper part of the tower is surrounded by a ring *k* of piping pierced with a series of small holes and connected to a suitable supply pipe *m*. Supported centrally above the head *a* is a distributing device *n* preferably made of baked clay, glass, porcelain or other suitable material inert to the action of acid. The distributer is umbrella shaped as shown. Supported at a suitable height adjacent to the top of the tower A is a tank B provided with an outlet pipe *o* forming a trap and terminating above the center of the distributer *n*. A pipe *p* provided with a spigot is connected to main receptacle (not shown) containing sulfuric acid. Within the lower part of the tower A above the pipe *e* is a grate *r* upon which, before the apparatus is operated, pebbles, broken quartz or similar acid inert material is placed, extending preferably to the pipe *d*.

The operation of the apparatus is as follows: The acid having a strength of from 97 to 99.5% absolute $H_2SO_4$, being turned on, fills the tank B to a suitable level and thence flows through pipe *o* at a regulated rate (determined by the bore of the pipe or by a cock which may be inserted therein) and drops upon the center of the distributer *n* from which it flows through the holes *c* in substantially uniform streams upon the packing of quartz or equivalent material supported by the grate *r* within the tower. Reaching said quartz the acid slowly spreads over its multitudinous surfaces and, as a thin film of great total area, gradually works its way toward the bottom of the tower. Through the pipe *e* which has been previously connected to a source of sulfuric anhydrid ($SO_3$), this gas is caused to enter the base of the tower below the grate *r* by a suitable blower, not shown, in admixture with air at a strength of preferably between 4 and 8 per cent. $SO_3$ by volume, this gas meeting in its ascent the downflowing film of $H_2SO_4$ and combining therewith. With proper regulation of the temperature, all the $SO_3$ will be combined with the $H_2SO_4$ before the former reaches the top of the tower so that there will be no excess of $SO_3$ escaping through the pipe *d*. There will be, however, an uncombined mixture of air and other gas or gases that were brought in with the supplied $SO_3$ and this is permitted to escape through the pipe *d*.

We call this carrier of $SO_3$ "air" in this specification.

To effect the above complete combination of $H_2SO_4$ and $SO_3$ to produce oleum, i. e. fuming sulfuric acid, it is necessary, as above stated to fix exactly the amount of $H_2SO_4$ and $SO_3$ supplied to the tower in a given time as also the temperature at which the combination is to take place. As considerable heat is developed in the reaction, which if not removed, would mar the process, it becomes a problem of cooling or abstracting heat from the tower. We accomplish this by supplying the pipe ring $k$ through supply pipe $m$ with a regulated amount of water or other cooling fluid from any suitable source. This water, or other cooling fluid, is evenly distributed around the periphery of the tower by means of the holes in the ring $k$ and flows as a thin sheet along the outer wall of the tower into the trough $i$ from whence it passes away by pipe $j$. By causing the flow of water to be greater or less, suitable reference being always had to its temperature, it is clear that heat will be abstracted from within the tower and the temperature of reaction correspondingly controlled.

In carrying out our process commercially we have used a tower of about 14 inches inside diameter by approximately 14 feet high from the grate $r$ to the head $a$. With this tower we have obtained most satisfactory results and have produced oleum without creating a cloud in the escaping air i. e. a clear exit. In case the exit be not clear, the temperature of the apparatus is too high. The exit is made clear when the temperature of the apparatus is reduced. Obviously, however, such remedy will not apply if the operator has neglected to maintain a proper proportion between the downflowing absorbing acid and the ascending current of sulfuric anhydrid as previously pointed out.

With acid of a strength of 99% entering the top of the tower at a temperature of 58° F., and with the anhydrid having a strength of 5.4% at the blower, and with water supplied at a temperature of 34° F., and the temperature of the gas containing sulfuric anhydrid entering the tower at 246° F., the air escaping at the discharge pipe $d$ was found to be 46° F., while the 20% oleum escaped through the pipe $f$ at a temperature of 150° F. The escaping air in the pipe $d$ is free from $SO^3$ and does not, therefore, contaminate the neighborhood as had been the case in former efforts to combine $SO_3$ with $H_2SO_4$ of the strength specified so as to produce the fuming acid or oleum. Never before our invention was the $SO_3$ completely absorbed in making fuming acid.

The temperature maintained without the tower is as has been shown, regulated in such manner that it is maintained below that at which $SO_3$ would be given off by oleum and above that at which $H_2SO_4$ will not absorb $SO_3$.

It is, of course, important that the temperature regulating water or other substance shall be near enough to the hottest part of the tower during operation as to control the temperature throughout the tower. Hence we have found that the tower should in the illustration given, leave not much more than 7 inches between the central part and the cooled outer part of the tower.

Sulfuric acid of a strength materially other than that specified will not produce the result described as to the final product and as to the complete absorption of sulfuric anhydrid.

The oleum resulting from the process passes off at the bottom of the tower through the pipe $f$ and siphon trap $h$.

The use of a trap in the acid supply $o$, as also that of trap $h$ in the outlet pipe $f$ at the bottom of the tower insures a more uniform flow of the incoming and outgoing fluids; it also provides a seal for said pipes in case of any cessation of operations at any time.

The apparatus shown in the drawing is preferred for carrying our invention into effect. The said apparatus is the subject of an application filed by us on August 11, 1910, Serial No. 576,713.

What we claim is:

1. The process of completely absorbing sulfuric anhydrid, carried by air, in sulfuric acid of a strength between 97% and 99.5% $H_2SO_4$ thereby converting said acid into oleum, which process consists in moving the gas in a direction opposite to that in which the finely divided acid moves and regulating the temperature in the vessel in which the substances meet and producing a substantially clear exit as specified.

2. The process of completely absorbing sulfuric anhydrid, carried by air, in sulfuric acid of a strength ranging between 97% and 99.5% $H_2SO_4$, thereby converting said sulfuric acid into oleum, which process consists in moving said gaseous mixture in a direction opposite to that in which said sulfuric acid, which has been finely divided, is moving and regulating the temperature within the vessel in which the substances meet by the application of a cooling medium to the outer side of said vessel and producing a substantially clear exit.

3. The process of completely absorbing sulfuric anhydrid, carried by air, in sulfuric acid, of a strength ranging between 97% and 99.5% $H_2SO_4$ thereby producing oleum, which process consists in moving said gaseous mixture in a direction opposite to that in which said sulfuric acid, which has been finely divided, is moving and maintaining within the vessel in which the substances meet a temperature below that at which sulfuric anhydrid is given off by the oleum and above that at which the sulfuric acid will not absorb sulfuric anhydrid and producing a clear exit.

4. The process herein described of completely separating sulfuric anhydrid from the air that carries it, in about the proportions specified, which process consists in bringing the ascending mixture of sulfuric anhydrid and air into contact with a descending film of sulfuric acid of the strength specified and so regulating the temperature of the apparatus that the sulfuric anhydrid will be substantially completely absorbed and the resulting oleum will flow downwardly, while the air will continue to ascend and escape.

In testimony whereof, we have hereunto set our hands in the presence of two subscribing witnesses.

THOMAS LYNTON BRIGGS.
HENRY F. MERRIAM.

Witnesses:
FRED A. KLEIN,
R. ABERLI.